United States Patent Office 3,536,627
Patented Oct. 27, 1970

3,536,627
AZEOTROPIC COMPOSITION OF PENTAFLUORO-PROPANE AND DICHLORODIFLUOROMETHANE
Kay L. Snider, Old Tappan, N.J., and Charles E. Rectenwald, South Charleston, W. Va., assignors to Technical Animations, Inc., Port Washington, N.Y., a corporation of New York
No Drawing. Continuation of application Ser. No. 590,221, Oct. 28, 1966. This application Dec. 30, 1968, Ser. No. 800,789
Int. Cl. C09k 3/02; F25b 15/00
U.S. Cl. 252—67              2 Claims

ABSTRACT OF THE DISCLOSURE

An azeotrope of pentafluoropropane and dichlorodifluoromethane is disclosed having utility as a refrigerant.

The present application is a continuation of U.S. patent application Ser. No. 590,221, filed Oct. 28, 1966 and now abandoned.

This invention relates to refrigerants and particularly to fluorine-containing compounds and mixtures thereof which are useful as refrigerants.

The mixed fluorine and chlorine derivatives of methane and ethane have attained widespread use in the field of refrigeration as a result of their chemical inertness, their low specific volumes and the wide range of boiling points which is available in the various members of the series. Difluorodichloromethane (B.P. $-29.8°$ C.), fluorotrichloromethane (B.P. $23.7°$ C.), fluorodichloromethane (B.P. $8.9°$ C.), monochlorodifluoromethane (B.P. $-40.8°$ C.), and tetrafluorodichloroethane (B.P. $3.5°$ C.) are among the most commonly used compounds of this type.

When apparatus designed to employ a particular refrigerant has been installed, the need sometimes arises for greater refrigerating capacity. This may be obtained by the use of a refrigerant having a lower boiling point and consequently a higher vapor pressure at the temperature attained by the gas prior to its being compressed and liquefied. The capacity of any given refrigeration compressor is roughly proportional to the pressure of the gas at the suction side of the compressor. Since the compressor can handle a fixed volume of gas per unit of time, an increase in the suction pressure means an increase in the amount (in pounds) of gas put through the compressor in a given time. An increase in the amount of gas means an increase in the total quantity of heat required to vaporize the liquid in the evaporator, and an increase in the amount of heat that is removed from the refrigerated space.

It is therefore an object of this invention to provide a novel refrigerant composition. Another object is to provide an azeotropic composition which is low-boiling and which is effective to provide increased refrigerating capacity for certain given apparatuses. Another object of this invention is to provide a new composition of matter and to thereby advance the art.

It has now been discovered that mixtures of dichlorodifluoromethane and 1,1,1,2,2-pentafluoropropane form an azeotrope with a minimum boiling point of approximately $-31.2°$ C. at one atmosphere. Very small changes in the boiling point were observed for mixtures containing from about 5 to about 20 percent by weight 1,1,1,2,2-pentafluoropropane. A particularly useful and preferred azeotropic mixture is one consisting of about 14 percent by weight 1,1,1,2,2-pentafluoropropane and about 86 percent by weight dichlorodifluoromethane.

It has been found that 1,1,1,2,2-pentafluoropropane and dichlorodifluoromethane, when mixed in the above proportions, form an azeotrope which distills at constant temperature, the liquid phase and the vapor phase in equilibrium therewith having the same composition. Such mixture is nonflammable and nontoxic in both the liquid phase and the vapor phase and is useful as a refrigerant.

The novel compositions of this invention were obtained in the course of distillation of a mixture of 1,1,1,2,2-pentafluoropropane and dichlorodifluoromethane. The mixture was charged to a laboratory distillation flask provided with an overhead condenser for the removal of distillate. The mixture was heated to its boiling point and distilled at high reflux. A mixture was removed at $-31.2°$ C. and at one atmosphere pressure which upon analysis was found to consist of 14 percent by weight 1,1,1,2,2-pentafluoropropane and 86 percent by weight dichlorodifluoromethane.

These refrigerants may be used in domestic or commercial refrigerators and freezers, industrial cooling systems and air-conditioning units, or in any other systems in which cooling is effected by the evaporation and expansion of liquid refrigerant.

What is claimed is:

1. A novel azeotropic composition which consists essentially of from about 5 to about 20 percent by weight of 1,1,1,2,2-pentafluoropropane and from about 95 to about 80 percent by weight dichlorodifluoromethane with a minimum boiling point of approximately $-31.2°$ C. at one atmosphere.

2. A novel azeotropic composition which consists essentially of about 14 percent by weight of 1,1,1,2,2-pentafluoropropane and about 86 percent by weight of dichlorodifluoromethane having a boiling temperature of about $-31.2°$ C. when measured at about one atmosphere pressure.

References Cited

UNITED STATES PATENTS 2,255,584    9/1941    Hubacker.
2,479,259    8/1949    Reed et al.

FOREIGN PATENTS 698,126    11/1964    Canada.

LEON D. ROSDOL, Primary Examiner

I. GLUCK, Assistant Examiner

U.S. Cl. X.R.

62—112; 252—69; 260—653

UNITED STATES PATENT OFFICE
CERTIFICATE OF CORRECTION

Patent No. 3,536,627      Dated October 27, 1970

Inventor(s) Kay L. Snider et al.

It is certified that error appears in the above-identified patent and that said Letters Patent are hereby corrected as shown below:

In the heading to the printed specification, lines 5 to 7, "assignors to Technical Animations, Inc., Port Washington, N. Y., a corporation of New York" should read -- assignors to Union Carbide Corporation, a corporation of New York --.

Signed and sealed this 16th day of March 1971.

(SEAL)
Attest:

EDWARD M. FLETCHER, JR.
Attesting Officer

WILLIAM E. SCHUYLER, JR.
Commissioner of Patents